United States Patent
Santos et al.

(10) Patent No.: US 7,200,705 B2
(45) Date of Patent: Apr. 3, 2007

(54) METHOD OF CHECKPOINTING STATE OF VIRTUAL MEMORY FOR PROCESS

(75) Inventors: Jose Renato Santos, San Jose, CA (US); Dinesh Kumar Subhraveti, Los Angeles, CA (US); Yoshio Frank Turner, Redwood City, CA (US); Gopalakrishnan Janakiraman, Sunnyvale, CA (US); David E. Lowell, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 10/836,957

(22) Filed: Apr. 30, 2004

(65) Prior Publication Data

US 2005/0257080 A1    Nov. 17, 2005

(51) Int. Cl.
*G06F 12/00* (2006.01)
(52) U.S. Cl. .............................. 711/6; 714/5
(58) Field of Classification Search ...... 711/6
See application file for complete search history.

(56) References Cited

U.S. PATENT DOCUMENTS

| | | | | |
|---|---|---|---|---|
| 5,325,531 A | * | 6/1994 | McKeeman et al. | 717/145 |
| 5,551,043 A | * | 8/1996 | Crump et al. | 713/323 |
| 6,338,147 B1 | | 1/2002 | Meth et al. | |
| 2002/0087916 A1 | | 7/2002 | Meth | |
| 2002/0129204 A1 | * | 9/2002 | Leighnor et al. | 711/118 |
| 2004/0078636 A1 | * | 4/2004 | Suzaki | 714/6 |

OTHER PUBLICATIONS

Bouteiller, A., et al., Coordinated checkpoint versus message log for fault tolerant MPI, Dec. 2003.
Duell, J., The Design and Implementation of Berkeley Lab's Linux Checkpoint/Restart, 2003.
Litzkow, M., et al., Checkpoint and Migration of UNIX Processes in the Condor Distributed Processing System, 1997.
Osman, S., et al., The Design and Implementation of Zap: A System for Migrating Computing Environments, Proc. OSDI 2002, Dec. 2002.

(Continued)

*Primary Examiner*—Brian R. Peugh
*Assistant Examiner*—Hashem Farrokh
(74) *Attorney, Agent, or Firm*—Richard P. Lange

(57) ABSTRACT

An embodiment of a method of checkpointing a virtual memory for a process comprises: accessing a page table that correlates logical addresses for the process to physical locations; saving memory resident pages identified for the process from the page table; and saving disk swap pages identified for the process from the page table, the step of saving disk swap pages being performed after the step of saving the memory resident pages.

17 Claims, 2 Drawing Sheets

OTHER PUBLICATIONS

Plank, J. S. et al., Libckpt: Transparent Checkpointing under Unix, < http://www.cs.utk.edu/plank/plank/papers/USENIX-95W.html>, 1995.

Plank, J. S., An Overview of Checkpointing in Uniprocessor and Distributed Systems, Focusing on Implementation and Performance, Tech. Report UT-CS-97-372, Univ. of Tenn., Knoxville, Tenn., Jul. 1997.

Stellner, G., CoCheck: Checkpointing and Process Migration for MPI, 1996.

Youhui, Z., et al., Checkpointing and Migration of parallel processes based on Message Passing Interface, Oct. 2002.

Zhong, H., et al., CRAK: Linux Checkpoint/Restart As a Kernel Module, Technical Report CUCS-014-01, < http://www.ncl.cs.columbia/research/migrate/crak.html>, Nov. 2001.

* cited by examiner

METHOD OF CHECKPOINTING STATE OF VIRTUAL MEMORY FOR PROCESS

RELATED APPLICATIONS

This application is related to U.S. application Ser. Nos. 10/836,538, 10/837,110, 10/837,410, and 10/837,420, filed on (the same day as this application), the contents of which are hereby incorporated by reference.

FIELD OF THE INVENTION

The present invention relates to the field of computer processes. More particularly, the present invention relates to the field of computer processes where a computer process is checkpointed.

BACKGROUND OF THE INVENTION

A computer in operation includes hardware, software, and data. The hardware typically includes a processor, memory, storage, and I/O (input/output) devices coupled together by a bus. The software typically includes an operating system and applications. The applications perform useful work on the data for a user or users. The operating system provides an interface between the applications and the hardware. The operating system performs two primary functions. First, it allocates resources to the applications. The resources include hardware resources—such as processor time, memory space, and I/O devices—and software resources including some software resources that enable the hardware resources to perform tasks. Second, it controls execution of the applications to ensure proper operation of the computer.

Often, the software is conceptually divided into a user level, where the applications reside and which the users access, and a kernel level, where the operating system resides and which is accessed by system calls. Within an operating computer, a unit of work is referred to as a process. A process is computer code and data in execution. The process may be actually executing or it may be ready to execute or it may be waiting for an event to occur. The system calls provide an interface between the processes and the operating system.

Checkpointing is a technique employed on some computers where processes take significant time to execute. By occasionally performing a checkpoint of processes and resources assigned to processes, the processes can be restarted at an intermediate computational state in an event of a system failure. Migration is a technique in which running processes are checkpointed and then restarted on another computer. Migration allows some processes on a heavily used computer to be moved to a lightly used computer. Checkpointing, restart, and migration have been implemented in a number of ways.

Operating system checkpoint, restart, and migration has been implemented as an integral part of several research operating systems. However, such research operating systems are undesirable because they lack an installed base and, consequently, few applications exist for them. Application level checkpoint, restart, and migration in conjunction with standard operating systems has also been implemented. But these techniques require that processes not use some common operating system services because the checkpointing only takes place at the application level.

Object based checkpoint, restart, and migration have also been implemented. Such object based approaches use particular programming languages or middleware toolkits. The object based approaches require that the applications be written in one of the particular programming languages or that the applications make explicit use of the middleware toolkits. A virtual machine monitor approach can be used to implement checkpoint, restart, and migration. But such an approach requires checkpointing and restarting all processes within the virtual machine monitor. This approach also exhibits poor performance due to isolation of the virtual machine monitor from an underlying operating system.

In *The Design and Implementation of Zap: A System for Migrating Computing Enviroments*, Proc. OSDI 2002, Osman et al. teach a technique of adding a loadable kernel module to a standard operating system to provide checkpoint, restart, and migration of processes implemented by existing applications. The loadable kernel model divides the application level into process domains and provides virtualization of resources within each process domain. Such virtualization of resources includes virtual process identifiers and virtualized network addresses. Processes within one process domain are prevented from interacting with processes in another process domain using inter-process communication techniques. Instead, processes within different process domains interact using network communications and shared files set up for communication between different computers.

Checkpointing in the technique taught by Osman et al. records the processes in a process domain as well as the state of the resources used by the processes. Because resources in the process domain are virtualized, restart or migration of a process domain includes restoring resource identifications to a virtualized identity that the resources had at the most recent checkpoint.

While the checkpoint, restart, and migration techniques taught by Osman et al. show promise, several areas could be improved. In particular, checkpointing of a state of a process's virtual memory which includes some pages resident in a disk swap space could be enhanced.

What is needed is an improved method of checkpointing a process's virtual memory which includes some pages resident in a disk swap space.

SUMMARY OF THE INVENTION

The present invention is a method of checkpointing a virtual memory for a process. The method begins with a step of saving memory resident pages. The method concludes with a step of saving disk swap pages after the step of saving the memory resident pages.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises a method of checkpointing a state of virtual memory for a process. According to an embodiment, the method comprises accessing a page table that correlates logical addresses for the process to physical locations, saving memory resident pages identified for the process from the page table and then saving disk swap pages identified for the process from the page table. By first saving the memory resident pages and then saving disk swap pages, the method of the present invention provides the benefit of avoiding thrashing during checkpointing of the state of the virtual memory for the process. Thrashing occurs when a memory resident page is moved from memory to disk swap space and then back to the memory in a short period of time.

According to another embodiment, the method comprises identifying un-modified memory mapped pages, saving file names and other memory mapping information for the un-modified memory mapped pages, saving memory resident pages other than the un-modified memory mapped pages in memory, and then saving disk swap pages other than the un-modified memory mapped pages in disk swap space. The un-modified memory mapped pages comprise memory mapped files and memory mapped portions of files that have not been modified. In contrast, the memory resident pages other than the unmodified memory mapped pages (as well as the disk swap pages other than the unmodified memory mapped pages) comprise memory mapped files that have been modified as well as regions of memory which are not mapped from files (e.g., dynamic data created by an application). The other memory mapping information comprises such information as file access permissions (i.e., read, write, or execute), whether a page is shared with other processes, and, for each portion of a file, an indication of the portion of the file which is typically expressed as an offset from a start of the file and a size of the portion of the file.

Figure 1:
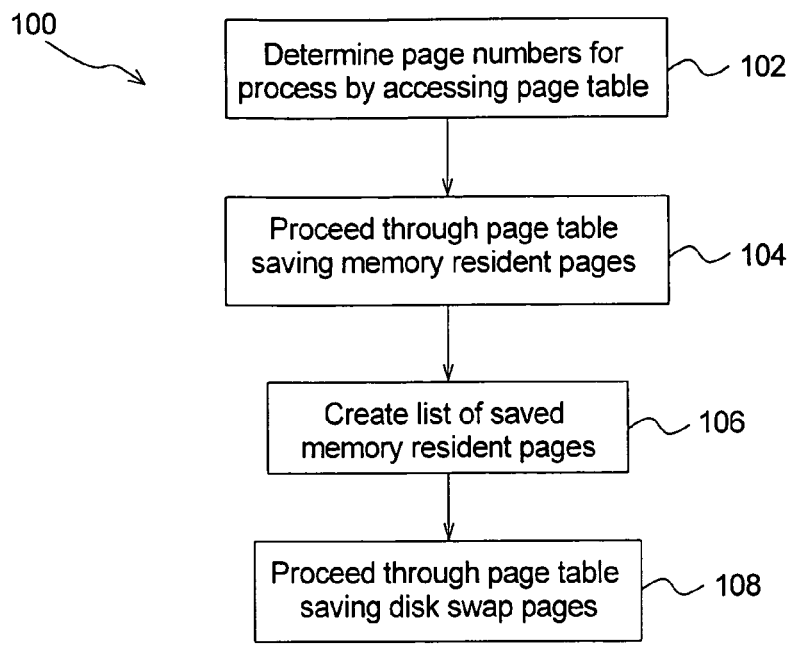
FIG. 1 illustrates an embodiment of a method of checkpointing a state of virtual memory for a process of the present invention as a flow chart.

An embodiment of a method of checkpointing a state of virtual memory for a process is illustrated as a flow chart in FIG. 1. The method 100 is implemented by the process operating at a kernel level of a computer system.

Figure 2:
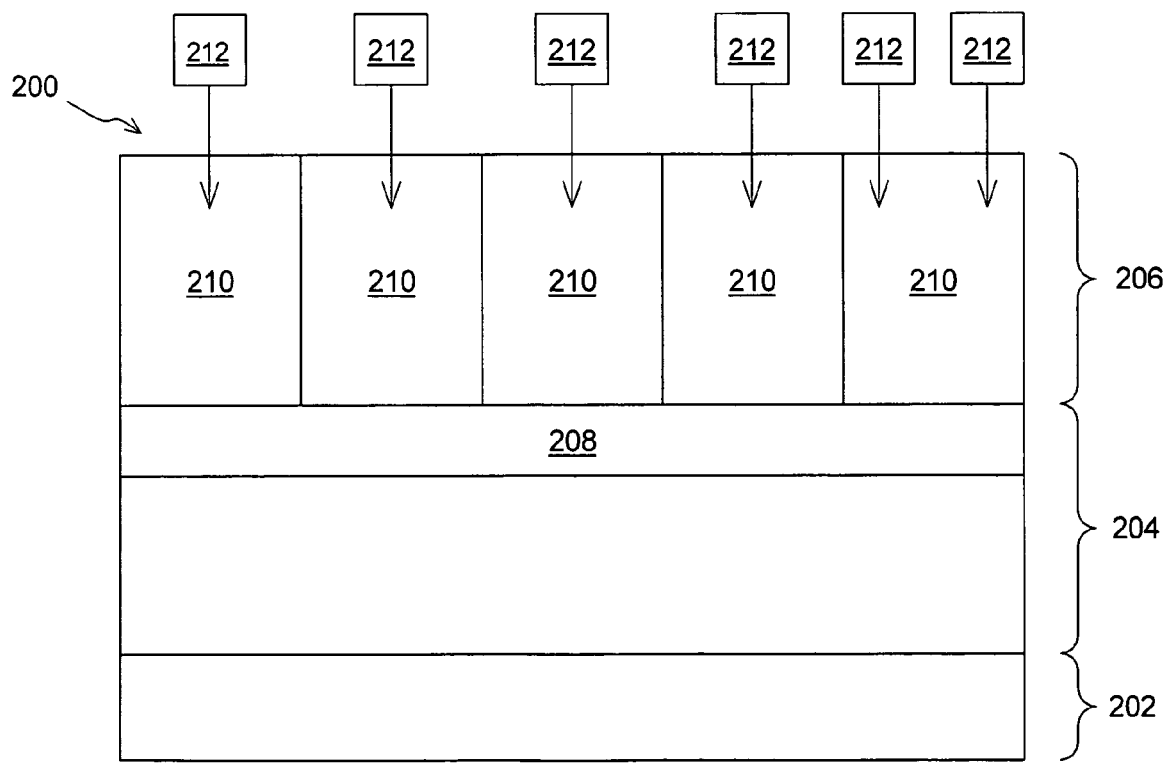
FIG. 2 schematically illustrates a computer system which implements a method of checkpointing a state of virtual memory for a process of the present invention.

An embodiment of the computer system which implements the method of checkpointing the state of the virtual memory is illustrated schematically in FIG. 2. The computer system 200 comprises computer hardware 202, the kernel level 204, and a user level 206. The kernel level 204 includes a process domain module 208, which divides the user level 206 into a plurality of process domains 210. As users 212 access and leave the computer systems 200, the process domain module 208 creates and terminates process domains 210 as needed.

According to an embodiment, the method 100 (FIG. 1) comprises a portion of a checkpointing method for the processes within one of the process domains 210. According to another embodiment, the method 100 comprises a portion of another checkpointing method.

The method 100 begins with a first step 102 in which the process determines page numbers of an address space for the process by accessing a page table at the kernel level. The address space for the process comprises logical addresses. An address within the address space comprises a page number and an offset. The page number indicates the page and the offset indicates a particular byte (or word) which is "offset" from a beginning of the page.

Figures 3, 4:
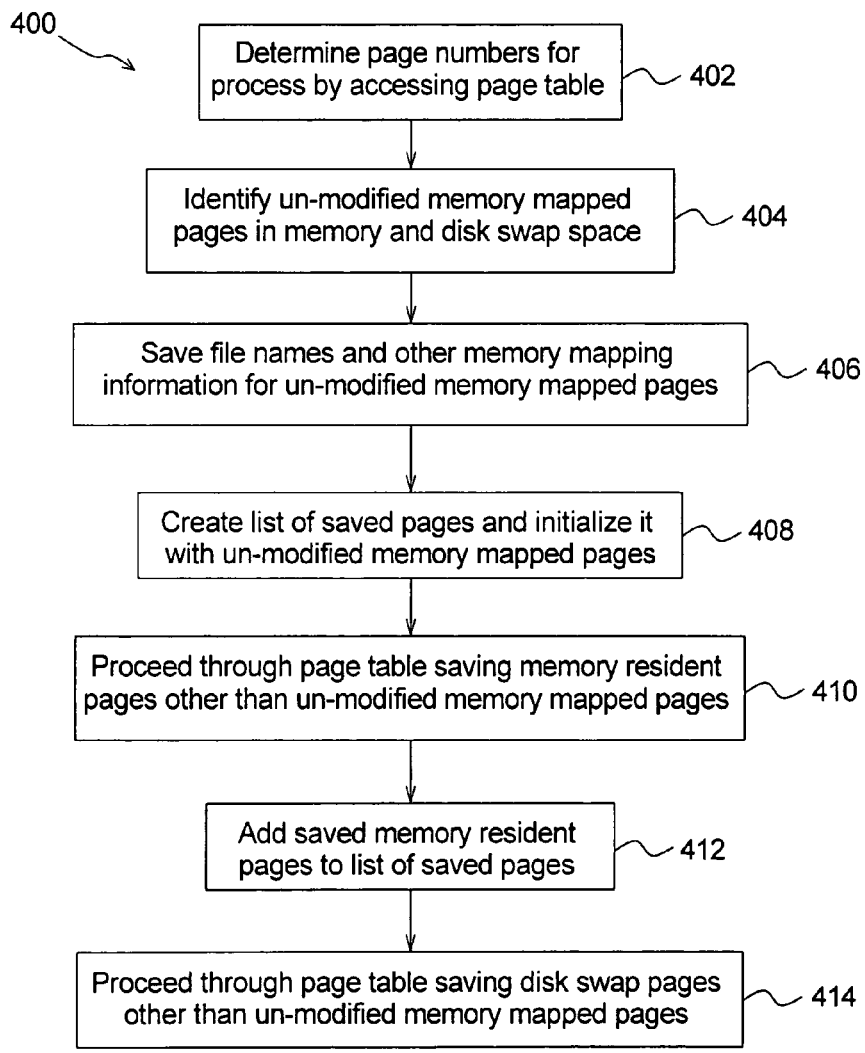
FIG. 3 is a page table employed by an embodiment of a method of checkpointing a state of virtual memory for a process of the present invention.
FIG. 4 illustrates another embodiment of a method of checkpointing a state of virtual memory for a process of the present invention as a flow chart.

An embodiment of the page table is provided in FIG. 3. The page table 300 comprises the page numbers 302 for the process correlated to frame numbers 304. The page table 300 maps the logical addresses for the process to physical addresses in the computer system 200 (FIG. 2).

It will be readily apparent to one skilled in the art that the page table 300 is an abstraction of an actual page table implemented by a processor. Further, it will be understood by one skilled in the art that an implementation of the actual page table is a matter of processor architecture defined by a manufacturer for a particular processor.

In a second step 104 (FIG. 1), the process proceeds through the page table 300 (FIG. 3) saving memory resident pages. According to the present invention, the page table 300 implements a virtual memory. The virtual memory expands the memory by allowing some frames of the virtual memory to be stored on a secondary memory such as a disk drive. According to an embodiment, the page table 300 indicates whether the frame is resident in the memory according to a present bit 306. If the present bit is set to "1," the frame resides in the memory. If the present bit is set to "0," the frame resides on the disk. According to this embodiment, the process proceeds through the page table 300 in the second step 104 using the page numbers determined in the first step 102 and saving the pages having the present bit set to "1."

The method continues with a third step 106 in which the process creates a list of the memory resident pages saved in the second step 104. Preferably, the process performs the third step 106 concurrently with the second step 104. According to an embodiment where the process performs the second and third steps, 104 and 106, concurrently, the process saves a memory resident page and then adds an entry to the list before saving a next memory resident page. Alternatively, the process performs the third step 106 after the second step 104.

The method 100 concludes with a fourth step 108 in which the process proceeds through the page table 300 again saving disk swap memory pages. The process saves the disk swap memory pages by reading them into the memory and then saving them. According to an embodiment, the process proceeds through the operating system page table by the page numbers determined in the first step 102 less the page numbers included on the list created in the third step 106.

Another embodiment of a method of checkpointing a state of virtual memory for a process is illustrated as a flow chart in FIG. 4. The method 400 is implemented by the process operating at a kernel level of a computer system. The method 400 begins with a first step 402 in which the process determines page numbers of an address space for the process by accessing a page table at the kernel level. In a second step 404, the process identifies un-modified memory mapped pages. The un-modified memory mapped pages comprise files and portions of files which have been copied from disk storage into virtual memory and which have not been modified. In a third step 406, the process saves file names and other memory mapping information for the unmodified memory mapped pages. The other memory mapping information comprises such information as access permissions (i.e., read, write, or execute), an indication of whether a page is shared with other processes, and, for the portions of files, an indication of the portion of the file which is typically expressed as an offset from a start of the file and a size of the portion of the file. In a fourth step 408, the process creates a list of saved pages and initializes it with the un-modified memory mapped pages identified in the second step 404.

The method 400 continues with a fifth step 410 in which the process proceeds through the page table 300 (FIG. 3) saving memory resident pages other than the un-modified memory mapped pages identified in the list of saved pages. In a sixth step 412, the process adds the memory resident pages saved in the fifth step 410 to the list of saved pages. The method 400 concludes with a seventh step 414 in which the process proceeds through the page table 300 again saving disk swap memory pages other than the unmodified memory mapped pages in disk swap space. According to an embodiment, the process proceeds through the page table by the page numbers determined in the fourth step 404 less the page numbers identified in the list of saved pages created in the fourth step 408 and amended in the sixth step 412.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of checkpointing a state of virtual memory for a process comprising the steps of:
accessing a page table that correlates logical addresses for the process to physical locations;
saving memory resident pages identified for the process from the page table; and
saving disk swap pages identified for the process from the page table, said step of saving the disk swap pages being performed after the step of saving the memory resident pages.

2. The method of claim 1 further comprising the step of creating a list of the memory resident pages saved in the step of saving the memory resident pages.

3. The method of claim 1 further comprising the steps of:
identifying un-modified memory mapped pages in memory and disk swap space which comprise copies of files and file portions within disk storage; and
saving memory mapping information for the files and the file portions which comprise the un-modified memory mapped pages.

4. The method of claim 3 wherein the step of saving the memory resident pages avoids saving the un-modified memory mapped pages in the memory.

5. The method of claim 3 wherein the step of saving the disk swap pages avoids saving the un-modified memory mapped pages in the disk swap space.

6. A method of checkpointing a state of virtual memory for a process comprising the steps of:
identifying un-modified memory mapped pages in memory and disk swap space which comprise copies of files and file portions within disk storage; saving memory mapping information for the files and the file portions which comprise the un-modified memory mapped pages;
saving memory resident pages other than the un-modified memory mapped pages in the memory; and
saving disk swap pages other than the un-modified memory mapped pages within the disk swap space after the step of saving the memory resident pages.

7. A computer readable media comprising computer code for implementing a method of checkpointing a state of virtual memory for a process, the method of checkpointing the state of the virtual memory for the process comprising the steps of:
accessing a page table that correlates logical addresses for the process to physical locations;
saving memory resident pages identified for the process from the pagne table; and
saving disk swap pages identified for the process from the page table said step of saving the disk swap pages being performed after the step of saving the memory resident pages.

8. The computer readable media of claim 7 further comprising the step of creating a list of the memory resident pages saved in the step of saving the memory resident pages.

9. The computer readable media of claim 7 further comprising the steps of:
identifying un-modified memory mapped pages in memory and disk swap space which comprise copies of files and file portions within disk storage; and
saving file names and memory mapping information for the files and the file portions which comprise the un-modified memory mapped pages.

10. The computer readable media of claim 9 wherein the step of saving the memory resident pages avoids saving the un-modified memory mapped pages in the memory.

11. The computer readable media of claim 9 wherein the step of saving the disk swap pages avoids saving the un-modified memory mapped pages in the disk swap space.

12. A computer readable media comprising computer code for implementing a method of checkpointing a state of virtual memory for a process, the method of checkpointing the state of the virtual memory for the process comprising the steps of:
identifying un-modified memory mapped pages in memory and disk swap space which comprise copies of files and file portions within disk storage;
saving file names and memory mapping information for the files and the file portions which comprise the un-modified memory mapped pages;
saving memory resident pages other than the un-modified memory mapped pages in the memory; and
saving disk swap pages other than the un-modified memory mapped pages within the disk swap space after the step of saving the memory resident pages.

13. A method of checkpointing a state of virtual memory for a process comprising the steps of:
identifying pages within an address space for the process;
saving memory resident pages, the memory resident pages being among the pages identified within the address space for the process;
creating a list of the memory resident pages saved in the step of saving the memory resident pages; and
saving disk swap pages after the step of saving the memory resident pages, the disk swap pages being the pages within the address space for the process less the memory resident pages.

14. The method of claim 13 further comprising the steps of:
identifying un-modified memory mapped pages in memory and disk swap space which comprise copies of files and file portions within disk storage; and
saving memory mapping information for the files and the file portions which comprise the un-modified memory mapped pages.

15. The method of claim 14 wherein the step of saving the memory resident pages avoids saving the un-modified memory mapped pages in the memory.

16. The method of claim 14 wherein the step of saving the disk swap pages avoids saving the un-modified memory mapped pages in the disk swap space.

17. A computer readable media comprising computer code for implementing a method of checkpointing a state of virtual memory for a process, the method of checkpointing the state of the virtual memory for the process comprising the steps of:

identifying pages within an address space for the process;

saving memory resident pages, the memory resident pages being among the pages identified within the address space for the process;

creating a list of the memory resident pages saved in the step of saving the memory resident pages; and saving disk swap pages after the step of saving the memory resident pages, the disk swap pages being the pages within the address space for the process less the memory resident pages.

* * * * *

UNITED STATES PATENT AND TRADEMARK OFFICE
CERTIFICATE OF CORRECTION

PATENT NO. : 7,200,705 B2 Page 1 of 1
APPLICATION NO. : 10/836957
DATED : April 3, 2007
INVENTOR(S) : Jose Renato Santos et al.

It is certified that error appears in the above-identified patent and that said Letters Patent is hereby corrected as shown below:

In column 6, line 2, in Claim 7, delete "pagne" and insert -- page --, therefor.

Signed and Sealed this

Thirteenth Day of January, 2009

JON W. DUDAS
*Director of the United States Patent and Trademark Office*